United States Patent [19]

Gaines

[11] 4,174,254
[45] Nov. 13, 1979

[54] COMPRESSION HUB

[75] Inventor: Albert L. Gaines, West Simsbury, Conn.

[73] Assignee: Combustion Engineering, Inc., Windsor, Conn.

[21] Appl. No.: 832,492

[22] Filed: Sep. 12, 1977

[51] Int. Cl.² .............................................. G21B 1/00
[52] U.S. Cl. ............................................ 176/2; 176/3
[58] Field of Search ............................... 176/1, 3, 5–8, 176/2

[56] References Cited

PUBLICATIONS

IEEE Pub. No. 75 CH1097-5-NPS, (10/21/75), pp. 470–473, Citrolo et al.
IEEE Pub. No. 75 CH1097-5-NPS, (10/21/75), pp. 552–555, Baker et al.
IEEE Pub. No. 75 CH1097-5-NPS, p. 1088.
IEE Pub. No. 75 CH1097-5-NPS, pp. 738–742, Bongnos et al.

Primary Examiner—Samuel W. Engle
Assistant Examiner—S. A. Cangialosi
Attorney, Agent, or Firm—Edward L. Kochey, Jr.

[57] ABSTRACT

A hub for bucking horizontal forces of a fusion reactor is formed of a plurality of horizontal pancake elements. A coolant flow-path is formed between adjacent surfaces of the pancakes, and interconnection of these is by a limited number of vertical openings through the pancakes.

6 Claims, 7 Drawing Figures

COMPRESSION HUB

BACKGROUND OF THE INVENTION

This invention relates to compression hubs for fusion reactor systems and in particular to a structure to facilitate cooling of the hub.

Superconducting magnets are used to attain intense magnetic fields in magnetic confinement systems for fusion reactors. The magnets are located in a polygonal relationship and intense forces are generated tending to draw these magnets together. Accordingly, a hub must be supplied to buck these horizontal forces.

The superconductor of the magnet which is surrounding the hub must be cooled below a critical temperature in order to obtain desired magnetic field. These critical temperatures are very close to absolute zero. For instance, the critical temperature of niobium-titanium is 9.4° kelvin while niobium-tin is 18.0° kelvin.

These conductors are normally operated at 4.2° to 4.9° kelvin so as to avoid losing the superconductivity property with slight heating, and to maintain it in intense magnetic fields. In order to obtain this low temperature, the conductors are cooled by liquid helium which boils at 4.2° kelvin at atmospheric pressure. Since the temperature level is not only extremely low, but the transition from superconductivity is also very sharp, it is important that the surrounding structural material also be maintained at the extremely low temperature. This includes the hub since any heat transferred from the hub to the magnet would destroy the effectiveness of the equipment.

Prior to starting operation of the reactor, the hub is obviously at room temperature. It must be cooled about 300° kelvin in order to reach the operating temperature. The practice of depending on the cooling of the magnets to remove heat conducted from the hub would require a start-up time of many weeks before operating conditions could be reached. Passing liquid helium through the hub would provide means for cooling the hub independently of the magnet cooling system. Since the coolant itself is only about 4.2° kelvin, and the temperature level is very critical, it is clear that the last portion of the cooling is most critical. Very little temperature gradient exists for the purpose of cooling the hub. It follows that in order to obtain reasonable cooling time, the coolant flow path must be arranged in such a manner that no portion of the hub is a significant distance (say 25 centimeters) away from the coolant itself. The drilling of vertical openings through the hub on such spacings is unacceptable since it weakens the hub to too great an extent. The openings through the hub would increase the structural elasticity of the hub. This in turn permits the superconducting magnets to move or flex during operation. As a result of this movement, the friction will heat the conductor above the critical temperature. Consequently, such loss of stiffness in the hub cannot be tolerated.

SUMMARY OF THE INVENTION

It is an object of the invention to resist the forces of magnets of a fusion reactor with an apparatus which can be relatively quickly cooled to facilitate start-up time and which is sufficiently rigid to avoid deleterious flexing and heating of the superconducting magnets.

The invention permits the support of the magnetic loads and the attainment of a relatively short cool down time for the structure. A plurality of polygonal metallic pancakes or layers are arranged in a stacked relationship. The pancakes are sealed, usually by welding around the perimeter to confide the coolant and are spaced from one another throughout the adjacent surfaces. Flow chambers are thereby formed between the adjacent pancakes through which coolant passes. The pancakes are relatively thin and no portion of the metal is more remote from the coolant than one-half the thickness of the pancakes. A limited number of vertical openings through each of the pancakes connects the flow chambers. The major flow openings are horizontal in a direction parallel to that of the major loads carried by the structure. Accordingly, the required stiffness of the structure under compressive horizontal loads is maintained.

Locating openings in adjacent pancakes remote from one another enforces the desired horizontal flow through the flow chambers. Spacing means may be located between adjacent pancakes to ensure a desired opening and to space the pancakes prior to seal welding the perimeter.

The spacing means may also be located so as to baffle the flow through the openings. Alternately, grooves may be placed in adjacent pancakes for the purpose of encouraging flow in particular flow paths.

DESCRIPTION OF THE PREFERRED EMBODIMENT

Figure 1:
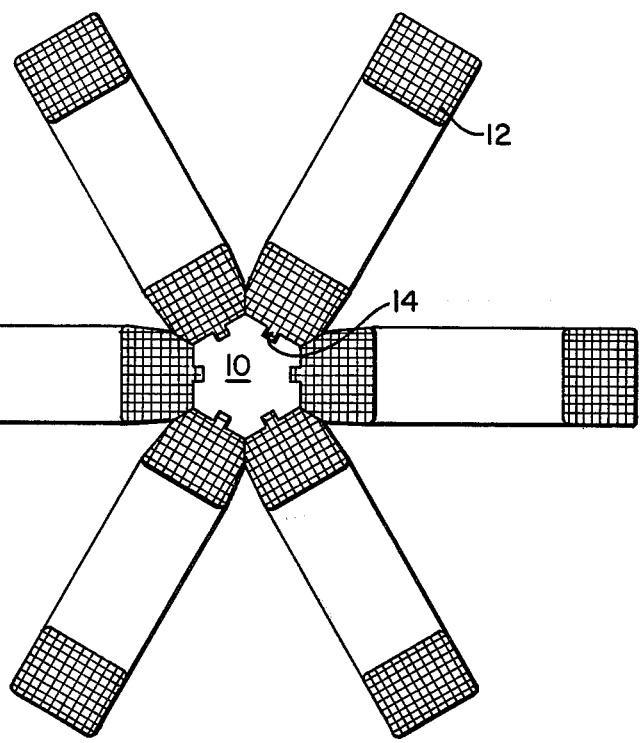
FIG. 1 is a plan view showing the general arrangement of the compression hub and the magnetic coils.
Figure 2:
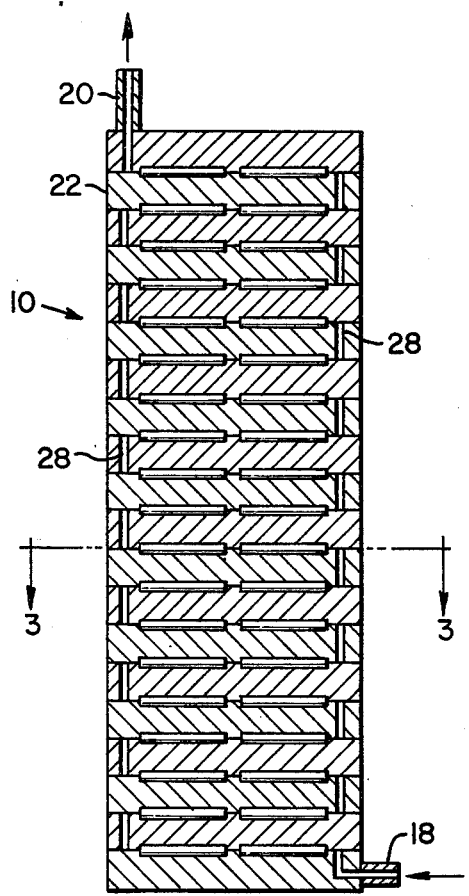
FIG. 2 is a sectional elevation through a preferred embodiment of the hub.

Referring to FIG. 1 the hub 10 is surrounded by a plurality of magnetic coils 12. It can be seen that these coils butt against the hub which is required to resist the substantial forces tending to draw opposing magnets together. During certain operating conditions these magnets will tend to rotate around a horizontal axis with a relatively minor force. This movement is restrained by the protrusion 14 associated with each of the magnets which engages groove 16 of the hub. It can be seen, therefore, that the major force on the hub is a significant horizontal compressive force, but the hub must also be able to resist some torque about a horizontal axis.

Since the superconducting magnets must operate at an extremely low temperature, it is essential that the hub itself be cooled to a low temperature before operation of the reactor can begin. This is accomplished by passing cooled helium from inlet 18 to outlet 20. Since the coolant circuits will operate at atmospheric pressure, the coolant will be in the form of a gas initially but will ultimately be a liquid coolant as 4.2° kelvin is reached.

The layers or pancakes 22 are formed of aluminum, stainless steel, or some other metal suitable for resisting substantial forces at extremely low temperatures. Shear member 24 is placed between adjacent pancakes and the adjacent pancakes are seal welded at the outer perimeter by seal weld 25. As illustrated, this may consist of a flat strip which is welded to each of the pancakes.

It can be seen that a flow chamber 26 is thereby formed between the adjacent pancakes.

Figure 3:
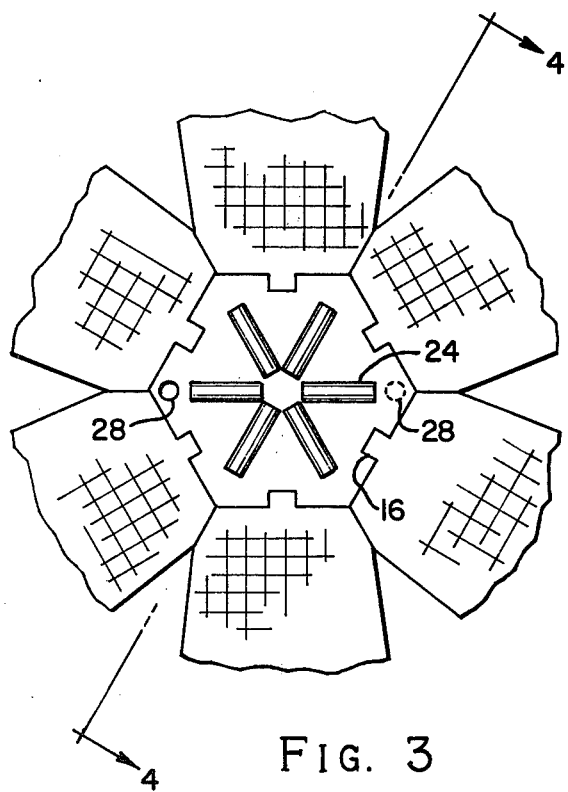
FIG. 3 is a sectional plan view through the hub.
Figure 4:
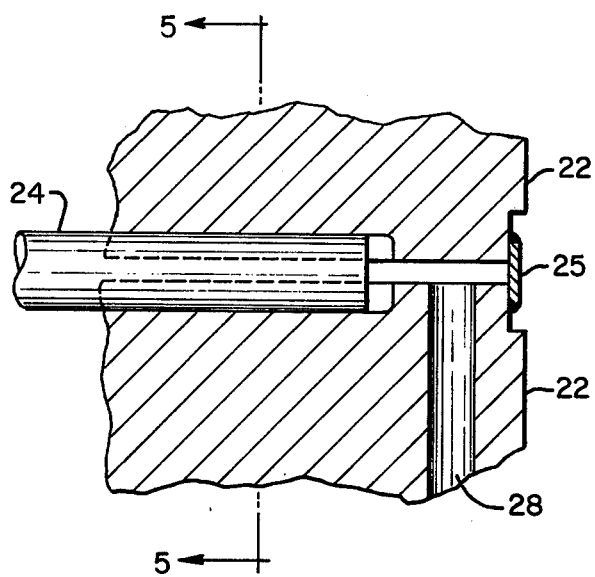
FIG. 4 is a detail of the seal welding arrangement.
Figure 5:
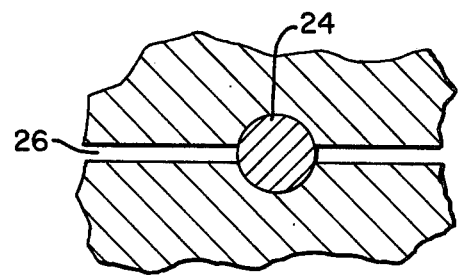
FIG. 5 is a detail of the shear member located between pancakes.

A vertical opening 28 is formed in each of these pancakes at a location near a corner of the hexagon. This opening connects the flow chambers which are above and below the respective pancake. The flow opening in the adjacent pancake is at a location remote from the location of the first pancake so that flow passing from one opening to the other must traverse the horizontal space. The shear members 24 which are also spacer members may be located as illustrated in FIG. 3 to encourage any desired flow path of the fluid passing between the adjacent pancake. As 4.2° kelvin is approached, the helium becomes a superfluid liquid. At that time, the entire surface will be wetted regardless of the flow path structure and cooling of the hub will be accomplished by boiling of the helium with a concomitant high heat transfer rate. It follows that the particular flow path selected is not critical at this time when the temperature differential available for cooling the hub is extremely low. At earlier times in the cool down process, the helium will be in gaseous form and the appropriate baffling will offer some improvement in the stress pattern which occurs during cool down.

Baffling which promotes flow of the coolant around the outer perimeter of the hub can be expected to cool that portion of the hub before the center. Since it is the outer perimeter which is in contact with the magnets, start-up operation of the system can begin even though the core of the hub has not yet reached the required temperature. This, however, requires a continued flow of coolant even after start-up operation so that the heat from the center of this hub does not work its way into the magnets.

The vertical openings through the pancakes are located near a corner of the polygon where the loss of material has minimum effect on stiffness of the structure. While only one opening has been shown through each pancake in the preferred embodiment, several openings could be used, provided however, that a reasonable flow path is maintained between the openings of the adjacent pancakes. It is desirable that the two flow paths so formed be joined in each flow chamber, and not separated. This minimizes the possibility of temperature differences formed because of different flow characteristics of the two flow paths.

Figure 6:
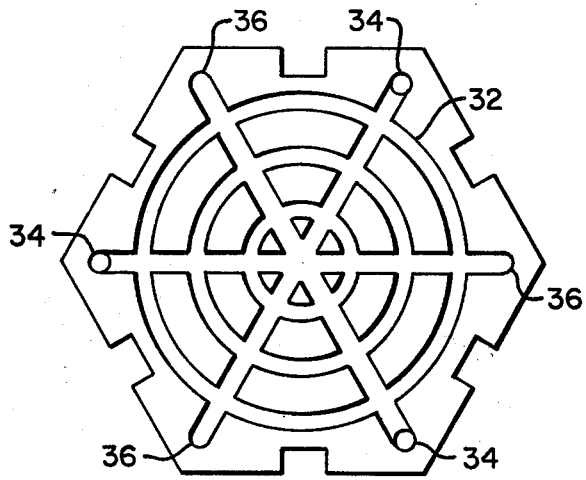
FIG. 6 is a sectional plan view through an alternate embodiment.

While the particular flow path between adjacent pancakes is not significant when the helium is actually liquid, it will effect the stress pattern and the time of cooling before absolute zero is approached. FIG. 6 illustrates an alternate embodiment wherein grooves 32 are formed in the upper face of each pancake. Three openings 34 are illustrated which pass through the pancake to convey coolant upwardly from the chamber below. Groove extensions 36 are in alignment with the openings of the pancake which rests on top of the one illustrated. Identical pancakes may be used and alignment of the respective pancakes is accomplished by rotating them one flat. Sealing of the surface between adjacent pancakes around the grooves is not desired since it is desirable to permit liquid helium to infiltrate these spaces during the last portion of the cooling. The grooves, however, tend to encourage a particular flow pattern of the gaseous helium during the earlier stages of cooling, thereby effecting a uniform cooling of the metallic structure.

The torque imposed on the hub through projection 14 introduces shear and torque between adjacent pancake members. In order to assist the seal weld 25 in resisting this force shear members 24 are placed between adjacent pancakes in grooves machined in the adjacent pancake. These shear members are radially oriented so as to effectively resist rotation as well as shear between adjacent pancakes. As previously described, the same shear members may also function as flow deflection baffles.

Figure 7:
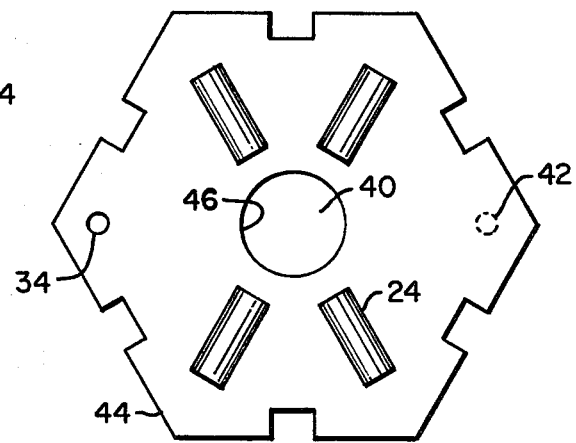
FIG. 7 is a sectional plan view through another alternate embodiment.

FIG. 7 is an alternate embodiment wherein there is a central hole 40 through the entire stack of pancakes. This sectional plan view through the stack of pancakes shows the flow opening 34 in the pancake which is exposed to view. Reference numeral 42 indicates the flow opening which is in the adjacent pancakes. Shear and spacer members 24 function to space the pancakes before seal welding and also to help resist shear forces. They additionally baffle the flow in passing from opening 34 to opening 42. The pancakes are sealed around the outer perimeter 44 and also the inner perimeter 46.

What is claimed is:

1. A compression hub for bucking forces of magnets in a fusion reactor comprising: a plurality of polygonal metallic pancakes arranged in stacked relationship; said pancakes sealed to one another at the perimeter thereof, and spaced from one another within the seal welded area, thereby forming flow chambers between adjacent pancakes; at least one vertical opening through each of said pancakes in fluid communication with the flow chambers above and below the respective pancake; and the vertical openings through adjacent pancakes being remote from one another, whereby coolant flowing from one opening to another passes through the flow chamber intermediate the adjacent pancakes.

2. An apparatus as in claim 1 including also spacing means between adjacent pancakes located within the perimeter of said pancakes.

3. An apparatus as in claim 2 wherein said spacing means are located to baffle the flow passing through said flow chambers in a manner to avoid direct flow from one opening to another.

4. An apparatus as in claim 1 wherein at least one of said adjacent pancakes includes grooves connecting the openings in adjacent pancakes.

5. An apparatus as in claim 1 wherein the openings through said pancakes are located near a corner of the polygon.

6. An apparatus as in claim 1 wherein said pancakes have vertical central holes therethrough forming an inner perimeter, said pancakes being sealed to one another at both the inner and outer perimeters.

* * * * *